(12) United States Patent
Petersen et al.

(10) Patent No.: US 7,433,994 B2
(45) Date of Patent: Oct. 7, 2008

(54) ON-DEVICE DATA COMPRESSION TO INCREASE SPEED AND CAPACITY OF FLASH MEMORY-BASED MASS STORAGE DEVICES

(75) Inventors: Ryan M. Petersen, San Jose, CA (US); Franz Michael Schuette, Colorado Springs, CO (US)

(73) Assignee: OCZ Technology Group, Inc., Sunnyvale, CA (US)

( * ) Notice: Subject to any disclaimer, the term of this patent is extended or adjusted under 35 U.S.C. 154(b) by 227 days.

(21) Appl. No.: 11/164,835

(22) Filed: Dec. 7, 2005

(65) Prior Publication Data
US 2006/0212645 A1    Sep. 21, 2006

Related U.S. Application Data

(60) Provisional application No. 60/593,076, filed on Dec. 7, 2004.

(51) Int. Cl.
*G06F 12/00* (2006.01)
(52) U.S. Cl. ...................... 711/103
(58) Field of Classification Search ............. 711/103, 711/118; 707/101
See application file for complete search history.

(56) References Cited

U.S. PATENT DOCUMENTS 6,067,199 A * 5/2000 Blumenau ............ 360/48
6,654,851 B1 * 11/2003 McKean ............... 711/112

* cited by examiner

*Primary Examiner*—Hiep T Nguyen
(74) *Attorney, Agent, or Firm*—Hartman & Hartman, P.C.; Gary M. Hartman; Domenica N. S. Hartman

(57) ABSTRACT

A mass storage device having at least one flash memory device and DRAM or SRAM-based cache within a package, and which comprises a co-processor within the package for performing compression and decompression of cached data before writing the cached data to the flash memory device.

18 Claims, 2 Drawing Sheets

ON-DEVICE DATA COMPRESSION TO INCREASE SPEED AND CAPACITY OF FLASH MEMORY-BASED MASS STORAGE DEVICES

CROSS REFERENCE TO RELATED APPLICATIONS

This application claims the benefit of U.S. Provisional Application No. 60/593,076, filed Dec. 7, 2004, the contents of which are incorporated herein by reference.

BACKGROUND OF THE INVENTION

The present invention generally relates to memory devices for use with computers and other processing apparatuses. More particularly, this invention relates to a flash memory-based mass storage device having a memory cache and equipped with an associated co-processor to perform compression and decompression of cached data.

Removable flash memory-based storage devices (or simply flash memory devices) are non-volatile or permanent mass storage devices that may utilize a DRAM (dynamic random access memory) or SRAM (static random access memory) based cache. As peripheral devices with high flexibility and fast read/write speeds, flash memory devices are currently replacing floppy media as the primary portable media. Optical storage devices also provide the advantage of portable memory, though they lack the possibility of updating or changing data through overwriting or adding files at high write speed.

A shortcoming of flash memory devices is their relatively low write and read performance compared to, for example, hard disk drives. Implementation of compression algorithms to increase the throughput and capacity of flash memory drives has thus far been hampered by the lack of a common standard to specify one compression method that is understood by all host systems. While this does not necessarily pose a problem with transferring data within a defined group of host systems that can all be configured to understand the same compression, it is conceivable that compatibility problems are likely to arise if the same device is to be used with random host systems. A possible solution to this dilemma is the embedding of a specific software governing the compression and decompression of data on a system partition of the flash drive. However, downloading and installation of such third party software is often viewed as cumbersome and may meet with resistance from host computer users and system administrators, especially if data are to be transferred from one system to the other.

Currently, compression is primarily used in the form of software-based compression algorithms on host systems. For example, wave files are compressed to MP3 files and video files to MPEG format to reduce storage requirements for these file formats. However, all such compression mechanisms are performed on the host computer and not on the peripheral device that stores the files.

BRIEF SUMMARY OF THE INVENTION

The present invention provides a mass storage device having at least one flash memory device and DRAM or SRAM-based cache within a package, and which comprises co-processor means within the package for performing compression of cached data before writing the cached data to the flash memory device and performing decompression of data read from the flash memory device.

Advantages of the current invention include higher data density and write speeds than possible with conventional flash memory media, and consequently a lower low cost per bit as compared to conventional flash memory media. In addition, it is also believed that the provision with this invention of a hardware-based capability for data compression/decompression also has the ability to increase the read performance of the flash memory media.

Other objects and advantages of this invention will be better appreciated from the following detailed description.

DETAILED DESCRIPTION OF THE INVENTION

Figure 1:
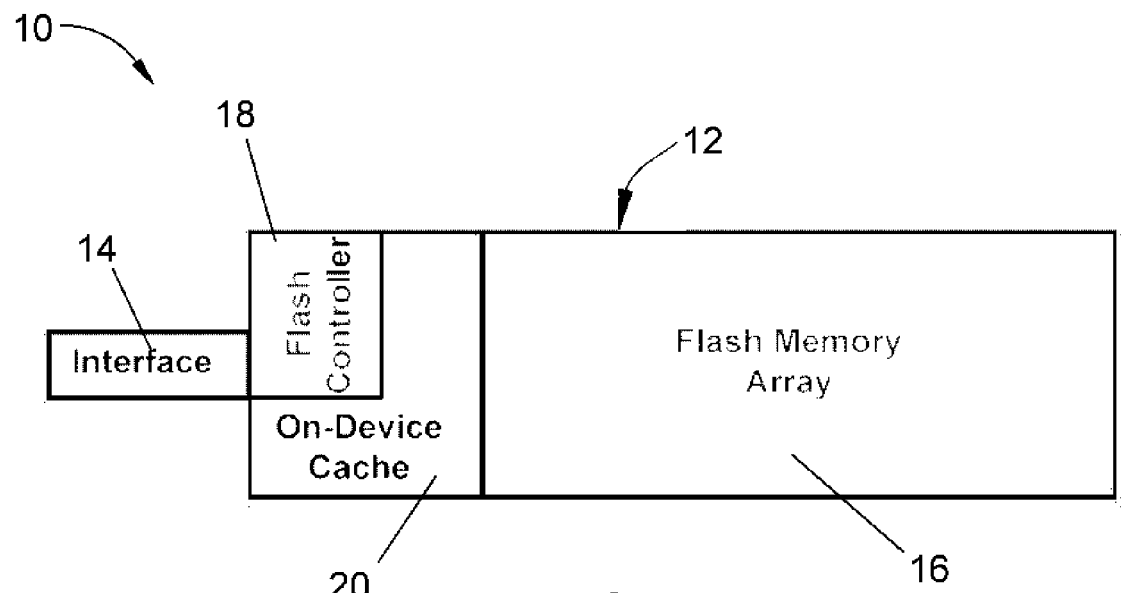
FIG. 1 is a schematic representation of a flash-based memory device in accordance with the prior art.
Figure 2:
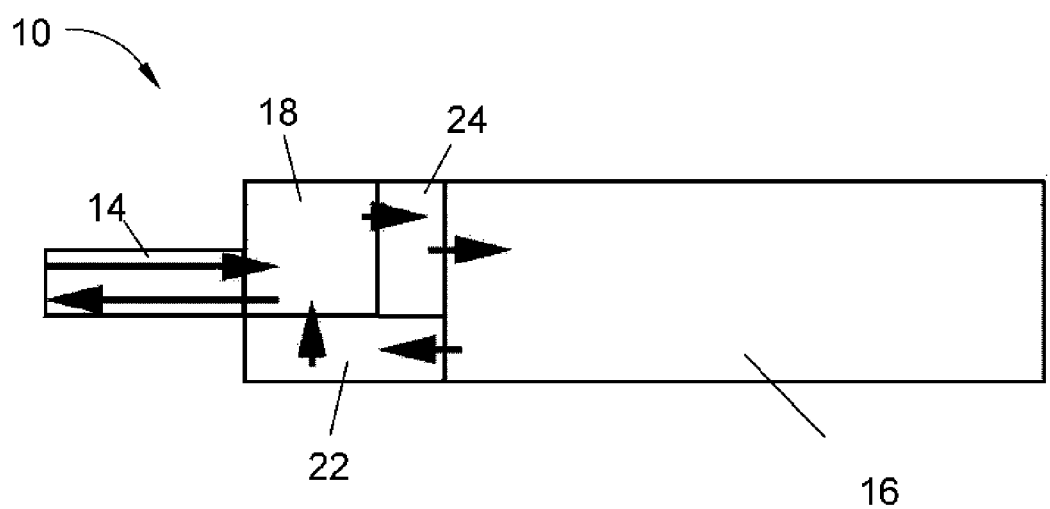
FIG. 2 is a diagrammatic representation of the data flow through the flash-based memory device of FIG. 1.

FIGS. 1 and 2 schematically represent a flash-based memory device (flash memory device) 10 of a type known in the art. The device 10 is preferably of a type configured as a peripheral device for a computer or other host system (processing apparatus) equipped with a data and control bus for interfacing with the flash memory device 10. The bus may operate in accordance with any suitable protocol known in the art, a preferred example being a universal serial bus ("USB"). The type and configuration of the host system to which the flash memory device 10 is connected and used is otherwise not pertinent to an understanding of the invention, and therefore will not be described in further detail.

As understood in the art, the flash memory device 10 is adapted to be accessed by the host system with which it is interfaced, which as represented in FIGS. 1 and 2 is through a USB interface 14 carried on a package 12 that defines the profile of the device 10. Access is initiated by the host system for the purpose of storing (writing) data to and retrieving (reading) data from a flash memory array 16 carried on the package 12, whose construction and configuration will depend on the particular application for the device 10 as well known in the art. As known in the art, the flash memory array 16 is preferably made up of a type of EEPROM (electrically erasable programmable read only memory) that can be erased and reprogrammed in blocks instead of one byte at a time. Because the access operation is initiated by the host system, its actual implementation will be specific to the particular host system interfaced with the device 10. Data pass through a flash controller 18 that provides a decoder function for the interface 14 and a cache controller function that controls the reading and writing operations to the flash memory array 16 through an on-device memory cache 20. As represented in FIG. 2, read and write operations are carried out through read and write cache 22 and 24, represented as units of the on-device memory cache 20. According to a preferred embodiment of the invention, the memory cache 20 is DRAM or SRAM-based, as known and understood in the art.

Figure 3:
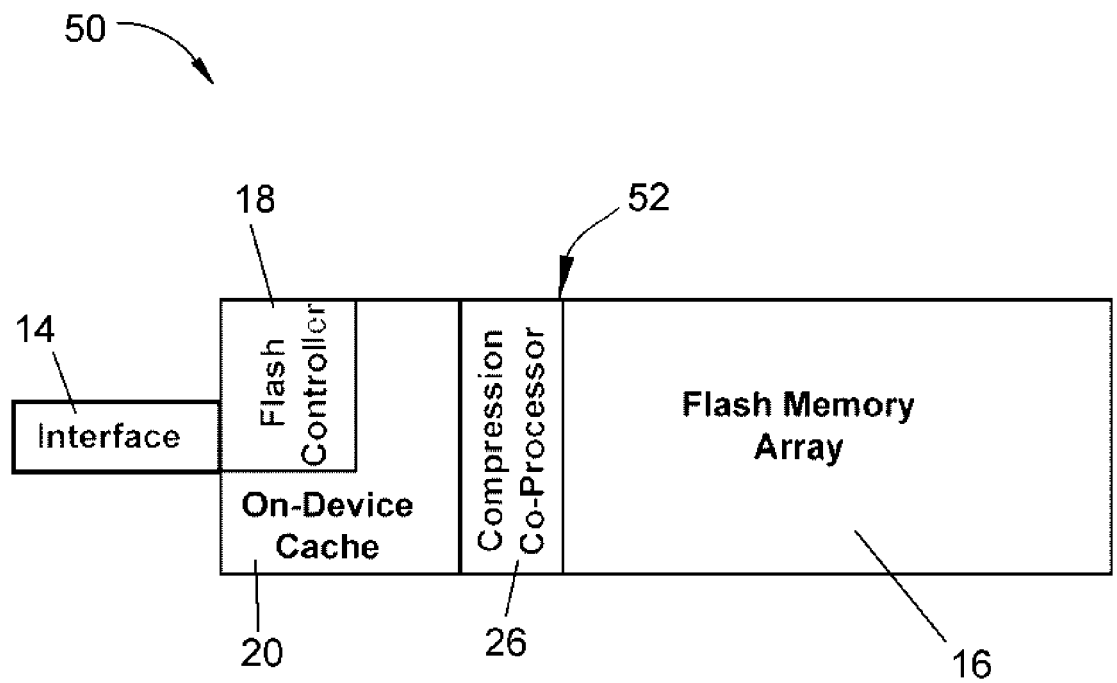
FIG. 3 is a schematic representation of a flash-based memory device having a compression co-processor in accordance with the invention.
Figure 4:
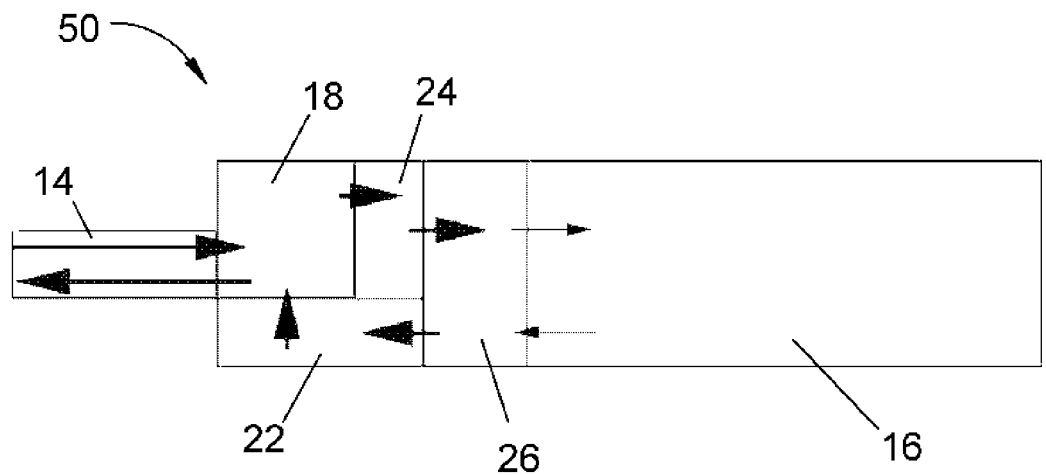
FIG. 4 is a diagrammatic representation of the data flow through the flash-based memory device of FIG. 3.

FIGS. 3 and 4 are schematic representations of a flash memory device 50 similar to the device 10 of FIGS. 1 and 2, but having a co-processor 26 carried on the device package 52 in accordance with this invention. The co-processor 26 provides a compression and decompression capability on the device 50, and therefore eliminates the need for a compression algorithm provided on the host system to which the device 50 is connected.

For convenience, FIGS. 3 and 4 use consistent reference numbers to identify components analogous to those of the flash memory device 10 of FIGS. 1 and 2. As with the prior art device 10, the flash memory device 50 of this invention is a mass storage device that comprises a host interface 14 (e.g., USB interface), a flash memory array 16 made up of (in a preferred embodiment) EEPROM chips, a controller 18, and a DRAM or SRAM-based cache 20, all physically carried on the package 52 to form a unitary device adapted for interfacing with any suitable host system, and preferably multiple host systems. The co-processor 26 is provided on the device 10 to perform "on-the-fly" compression of cached data in the write cache 24 before writing the cached data to the flash memory array 16, and thereafter decompression of the data read from the flash memory array 16 before relaying the read data to the read cache 22. As such, the device 10 of this invention is a peripheral device that carries its own embedded compression-decompression co-processor 26 that increases the throughput and memory capacity of the flash memory array 16. As such, the flash memory device 50 exhibits a higher write speed capability than possible with the device 10 of FIGS. 1 and 2, and may also be capable of a higher read speed capability than possible without the device 10 of FIGS. 1 and 2.

Devices suitable for the co-processor 26 are within the scope of those skilled in the art, and it is foreseeable that existing devices could be adapted to perform the compression-decompression operation of this invention. Furthermore, the co-processor 26 may operate on any type of operating system known or developed in the future. Implementation of the compression and decompression algorithms can be with any suitable standard currently existing, including but not limited to PKSIP, RAR, and LWZ, or an algorithm developed in the future. In one embodiment, the co-processor 26 has a prefetch scheduler capability to better optimize scheduling of read operations based on probability of the next access. For this purpose, the co-processor 26 may read the data out directly into the read cache or have a buffer for prefetched data.

While certain components are shown and preferred for the flash memory device 50 of this invention, it is foreseeable that functionally-equivalent components could be used or subsequently developed to perform the intended functions of the disclosed components. For example, emerging memory technologies such as those based on nanotechnology or organic memory substrates could in the future replace the currently preferred EEPROM technology. Therefore, while the invention has been described in terms of a preferred embodiment, it is apparent that other forms could be adopted by one skilled in the art, and the scope of the invention is to be limited only by the following claims.

What is claimed is:

1. A mass storage device having at least one flash memory device and DRAM or SRAM-based cache within a package, the flash memory device being readable and programmable in bytes in a random access fashion and erased and reprogrammed in blocks, the mass storage device comprising co-processor means within the package for performing hardware-based compression of cached data before writing the cached data to the flash memory device in random access fashion and performing hardware-based decompression of data read from the flash memory device in random access fashion.

2. The mass storage device according to claim 1, wherein at least one flash memory device comprises an EEPROM.

3. The mass storage device according to claim 1, wherein the mass storage device has a higher write speed capability than would be possible if the mass storage device did not comprise the co-processor means.

4. The mass storage device according to claim 1, wherein the mass storage device has a higher read speed capability than would be possible if the mass storage device did not comprise the co-processor means.

5. The mass storage device according to claim 1, further comprising a USB interface device.

6. The mass storage device according to claim 1. wherein the cache is DRAM-based.

7. The mass storage device according to claim 1, wherein the cache is SRAM-based.

8. The mass storage device according to claim 1, wherein the cache comprises write cache.

9. The mass storage device according to claim 1, wherein the cache comprises read cache.

10. The mass storage device according to claim 1, wherein the co-processor means comprises prefetch scheduler means.

11. A mass storage device comprising:
a package;
at least one flash memory device comprising an EEPROM within the package, the flash memory device being readable and programmable in bytes in a random access fashion and erased and reprogrammed in blocks;
DRAM or SRAM-based cache within the package;
a USB interface device on the package for interconnecting the mass storage device to a USB port; and
co-processor means within the package for performing hardware-based compression of cached data before writing the cached data to the flash memory device in a random access fashion and performing hardware-based decompression of data read from the flash memory device in a random access fashion.

12. The mass storage device according to claim 11, wherein the mass storage device has a higher write speed capability than would be possible if the mass storage device did not comprise the co-processor means.

13. The mass storage device according to claim 11, wherein the mass storage device has a higher read speed capability than would be possible if the mass storage device did not comprise the co-processor means.

14. The mass storage device according to claim 11, wherein the cache is DRAM-based.

15. The mass storage device according to claim 11, wherein the cache is SRAM-based.

16. The mass storage device according to claim 11, wherein the cache comprises write cache.

17. The mass storage device according to claim 11, wherein the cache comprises read cache.

18. The mass storage device according to claim 11, wherein the co-processor means comprises prefetch scheduler means.

* * * * *